US011935403B1

(12) United States Patent
Demisse

(10) Patent No.: US 11,935,403 B1
(45) **Date of Patent: *Mar. 19, 2024**

(54) VEHICLE IDENTIFICATION SYSTEM

(71) Applicant: RideShare Displays, Inc., Fairfield, NJ (US)

(72) Inventor: Dereje M. Demisse, Los Angeles, CA (US)

(73) Assignee: RideShare Displays, Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,992

(22) Filed: May 25, 2022

Related U.S. Application Data

(63) Continuation of application No. 16/923,825, filed on Jul. 8, 2020, now Pat. No. 11,355,009, which is a continuation of application No. 16/818,405, filed on Mar. 13, 2020, now Pat. No. 11,030,891, which is a continuation of application No. 16/731,558, filed on Dec. 31, 2019, now Pat. No. 10,748,417, which is a continuation of application No. 16/514,492, filed on Jul. 17, 2019, now Pat. No. 10,559,199, which is a continuation of application No. 16/198,140, filed on Nov. 21, 2018, now Pat. No. 10,395,525, which is a
(Continued)

(51) Int. Cl.
*G08G 1/017* (2006.01)

(52) U.S. Cl.
CPC .................................... *G08G 1/017* (2013.01)

(58) Field of Classification Search
CPC ...................................................... G08G 1/017
See application file for complete search history.

(56) References Cited

U.S. PATENT DOCUMENTS 4,360,875 A 11/1982 Behnke
4,550,304 A 10/1985 Saitta
(Continued)

FOREIGN PATENT DOCUMENTS

CN 201918124 U 8/2011
CN 202213529 U 5/2012
(Continued)

OTHER PUBLICATIONS

USPTO, IPR2021-01601, U.S. Pat. No. 10,559,199, Final Written Decision dated Apr. 10, 2023.
(Continued)

*Primary Examiner* — Daryl C Pope
(74) *Attorney, Agent, or Firm* — Welsh Flaxman & Gitler LLC

(57) ABSTRACT

A vehicle identification system includes one or more displays associated with a vehicle, a transceiver, and a controller communicatively coupled to the transceiver. The one or more displays are located to be visible from an exterior of the vehicle. The controller is adapted to generate a first signal to be transmitted by the transceiver to a mobile communication device associated with a driver of the vehicle when it is determined that the vehicle is within a predetermined distance of a specific location. The mobile communication device associated with the driver is adapted to generate a second signal to be transmitted to the one or more displays. The second signal represents an indicator.

10 Claims, 4 Drawing Sheets

Related U.S. Application Data continuation of application No. 15/860,939, filed on Jan. 3, 2018, now Pat. No. 10,169,987, which is a continuation of application No. 14/723,049, filed on May 27, 2015, now Pat. No. 9,892,637.

(60) Provisional application No. 62/004,753, filed on May 29, 2014.

(56) References Cited

U.S. PATENT DOCUMENTS

| | | | |
|---|---|---|---|
| 4,876,812 | A | 10/1989 | Haralson |
| D319,848 | S | 9/1991 | Hofman |
| D320,235 | S | 9/1991 | Hofman |
| 5,168,451 | A | 12/1992 | Bolger |
| 5,212,645 | A | 5/1993 | Wildes |
| 5,400,246 | A | 3/1995 | Wilson |
| D374,191 | S | 10/1996 | Terrebonne |
| 5,604,676 | A | 2/1997 | Penzias |
| 5,777,565 | A | 7/1998 | Hayashi |
| 5,779,263 | A | 7/1998 | Lane |
| 5,796,396 | A | 8/1998 | Rich |
| 5,799,263 | A | 8/1998 | Culbertson |
| 5,896,554 | A | 4/1999 | Itoh |
| 5,928,294 | A | 7/1999 | Zelinkovsky |
| 5,945,919 | A | 8/1999 | Trask |
| 6,028,537 | A | 2/2000 | Suman |
| 6,098,048 | A | 8/2000 | Dashefsky |
| 6,212,393 | B1 | 4/2001 | Suarez |
| 6,271,805 | B1 | 8/2001 | Yonezawa |
| 6,356,838 | B1 | 3/2002 | Paul |
| 6,414,635 | B1 | 7/2002 | Stewart |
| 6,418,234 | B1 | 7/2002 | Whited |
| 6,472,823 | B2 | 10/2002 | Yen |
| 6,486,801 | B1 | 11/2002 | Jones |
| 6,526,349 | B2 | 2/2003 | Bullock |
| 6,584,401 | B2 | 6/2003 | Kirshenbaum |
| 6,615,046 | B1 | 9/2003 | Ur |
| 6,618,593 | B1 | 9/2003 | Drutman |
| 6,667,698 | B2 | 12/2003 | Apostolopoulos |
| 6,675,150 | B1 | 1/2004 | Camer |
| 6,694,248 | B2 | 2/2004 | Smith |
| 6,697,730 | B2 | 2/2004 | Dickerson |
| 6,714,861 | B2 | 3/2004 | Okude |
| 6,756,913 | B1 | 6/2004 | Ayed |
| 6,759,965 | B1 | 7/2004 | Hatjasalo |
| 6,778,068 | B2 | 8/2004 | Wolfe |
| 6,801,837 | B2 | 10/2004 | Carlstedt |
| 6,810,328 | B2 | 10/2004 | Yokota |
| 6,812,851 | B1 | 11/2004 | Dukach |
| 6,856,933 | B1 | 2/2005 | Callaghan |
| 6,874,037 | B1 | 3/2005 | Abram |
| 6,882,290 | B2 | 4/2005 | French |
| 6,891,518 | B2 | 5/2005 | Sauer |
| 6,919,804 | B1 | 7/2005 | Cook |
| 6,926,203 | B1 | 8/2005 | Sehr |
| 6,940,403 | B2 | 9/2005 | Kail |
| 6,944,533 | B2 | 9/2005 | Kozak |
| 6,970,106 | B2 | 11/2005 | Vial |
| 6,975,997 | B1 | 12/2005 | Murakami |
| 7,062,376 | B2 | 6/2006 | Oesterling |
| 7,080,019 | B1 | 7/2006 | Hurzeler |
| 7,129,887 | B2 | 10/2006 | Mitchell |
| 7,154,383 | B2 | 12/2006 | Berquist |
| 7,187,278 | B2 | 3/2007 | Biffar |
| 7,190,282 | B2 | 3/2007 | Maemura |
| 7,215,255 | B2 | 5/2007 | Grush |
| 7,221,287 | B2 | 5/2007 | Gueziec |
| 7,307,391 | B2 | 12/2007 | Shan |
| 7,367,498 | B2 | 5/2008 | Kodaka |
| 7,395,149 | B2 | 7/2008 | Matsumoto |
| 7,466,356 | B2 | 12/2008 | Hofer |
| 7,478,085 | B2 | 1/2009 | Rawat |
| 7,551,075 | B1 | 6/2009 | Monroe |
| 7,567,911 | B2 | 7/2009 | Kalinichenko |
| 7,586,877 | B2 | 9/2009 | Gits |
| 7,593,023 | B2 | 9/2009 | Cazier |
| 7,606,831 | B2 | 10/2009 | Quinn |
| 7,627,422 | B2 | 12/2009 | Adamczyk |
| 7,643,798 | B2 | 1/2010 | Ljung |
| 7,679,531 | B2 | 3/2010 | Keaveny |
| 7,738,402 | B2 | 6/2010 | Feldman |
| 7,742,873 | B2 | 6/2010 | Agnew |
| 7,743,984 | B2 | 6/2010 | Olsen |
| 7,751,971 | B2 | 7/2010 | Chang |
| 7,765,044 | B2 | 7/2010 | Neuburger |
| 7,775,437 | B2 | 8/2010 | Cohen |
| 7,822,426 | B1 | 10/2010 | Wuersch |
| 7,856,360 | B2 | 12/2010 | Kramer |
| 7,864,071 | B2 | 1/2011 | Bachelder |
| 7,870,025 | B2 | 1/2011 | English |
| 7,890,576 | B2 | 2/2011 | Button |
| 7,920,071 | B2 | 4/2011 | Baillot |
| 7,925,885 | B2 | 4/2011 | Zhelev |
| 7,941,267 | B2 | 5/2011 | Adamczyk |
| 7,953,618 | B2 | 5/2011 | Pearce |
| D642,159 | S | 7/2011 | Joseph |
| 8,055,534 | B2 | 11/2011 | Ashby |
| 8,060,938 | B2 | 11/2011 | Chang |
| 8,103,402 | B2 | 1/2012 | Kozlay |
| 8,116,836 | B2 | 2/2012 | Ki |
| 8,122,103 | B2 | 2/2012 | Grimault |
| 8,126,641 | B2 | 2/2012 | Horvitz |
| 8,126,903 | B2 | 2/2012 | Lehmann |
| 8,140,256 | B1 | 3/2012 | Dos-Santos |
| 8,160,973 | B2 | 4/2012 | Baggett |
| 8,185,307 | B2 | 5/2012 | Sprigg |
| 8,209,118 | B2 | 6/2012 | Chang |
| 8,224,571 | B2 | 7/2012 | Huang |
| 8,285,571 | B2 | 10/2012 | Demirdjian |
| 8,293,687 | B2 | 10/2012 | Giffin |
| 8,311,560 | B2 | 11/2012 | Kong |
| 8,311,874 | B2 | 11/2012 | Gupta |
| 8,315,921 | B2 | 11/2012 | Hallowell |
| 8,362,894 | B2 | 1/2013 | Shah |
| 8,365,994 | B2 | 2/2013 | Mak |
| 8,386,177 | B2 | 2/2013 | Wu |
| 8,442,848 | B2 | 5/2013 | Myr |
| 8,469,153 | B2 | 6/2013 | Wu |
| 8,483,939 | B2 | 7/2013 | Wu |
| 8,504,285 | B2 | 8/2013 | Vepsaelaeinen |
| 8,515,822 | B2 | 8/2013 | Angert |
| 8,554,608 | B1 | 10/2013 | O'Connor |
| 8,565,789 | B2 | 10/2013 | Staffaroni |
| 8,615,345 | B2 | 12/2013 | Macneille |
| 8,631,407 | B2 | 1/2014 | Wagner |
| 8,635,556 | B2 | 1/2014 | Lalancette et al. |
| 8,682,391 | B2 | 3/2014 | Lee |
| 8,688,141 | B2 | 4/2014 | Ribaudo |
| 8,688,532 | B2 | 4/2014 | Khunger |
| 8,712,379 | B2 | 4/2014 | Yi |
| 8,717,196 | B2 | 5/2014 | Wang |
| 8,725,612 | B2 | 5/2014 | Mundinger |
| 8,749,578 | B2 | 6/2014 | Sheba |
| 8,774,527 | B1 | 7/2014 | Anguelov |
| 8,776,145 | B2 | 7/2014 | Hyde |
| 8,788,375 | B2 | 7/2014 | Podgurny |
| 8,799,038 | B2 | 8/2014 | Chen |
| 8,812,861 | B2 | 8/2014 | Osborn |
| 8,823,508 | B2 | 9/2014 | Thiruvengada |
| 8,854,985 | B2 | 10/2014 | Tsfaty |
| 8,878,702 | B2 | 11/2014 | Crucs |
| 8,892,348 | B2 | 11/2014 | Chamlou |
| 8,904,932 | B2 | 12/2014 | Kwarta |
| 8,909,256 | B2 | 12/2014 | Fraccaroli |
| 8,913,131 | B2 | 12/2014 | Chung |
| 8,918,230 | B2 | 12/2014 | Chen |
| 9,009,210 | B2 | 4/2015 | Marcinkiewicz |
| 9,020,533 | B1 | 4/2015 | Mangiardi |
| 9,026,454 | B2 | 5/2015 | Hinrichs |
| 9,037,852 | B2 | 5/2015 | Pinkus |
| D732,049 | S | 6/2015 | Amin |
| 9,066,206 | B2 | 6/2015 | Lin |
| D734,349 | S | 7/2015 | Amin |

(56) References Cited

U.S. PATENT DOCUMENTS

D738,901 S 9/2015 Amin
9,129,242 B2 9/2015 Wheeler
9,151,614 B2 10/2015 Poppen
D743,978 S 11/2015 Amin
9,197,863 B2 11/2015 Ozaki
9,214,101 B2 12/2015 Richmond
9,224,289 B2 12/2015 Demeniuk
9,228,841 B2 1/2016 Dutta
9,230,292 B2 1/2016 Amin
D750,110 S 2/2016 Amin
9,289,127 B2 3/2016 Mitsuhashi
9,318,152 B2 4/2016 Kretz
9,343,002 B2 5/2016 Hagemann
9,343,003 B2 5/2016 Podd
D759,032 S 6/2016 Amin
9,376,061 B2 6/2016 Mccarthy
9,392,418 B2 7/2016 Lubeck
9,406,251 B2 8/2016 Shao
9,424,515 B2 8/2016 Atlas
9,436,180 B1 9/2016 Fredinburg
9,442,888 B2 9/2016 Stanfield
9,454,341 B2 9/2016 Landry
9,460,623 B2 10/2016 Baughman
9,488,494 B2 11/2016 Millspaugh
9,494,938 B1 11/2016 Kemler
9,514,473 B2 12/2016 Sen
9,519,921 B2 12/2016 Wei
9,531,833 B2 12/2016 Le
9,536,271 B2 1/2017 Kalanick
9,542,609 B2 1/2017 Wu
9,549,307 B2 1/2017 Levy
9,644,982 B2 5/2017 Kantarjiev
9,648,651 B2 5/2017 Edge
9,679,322 B2 6/2017 Horstemeyer
9,702,962 B2 7/2017 Yu
9,704,327 B2 7/2017 Vawter
9,718,397 B2 8/2017 Kalanick et al.
9,736,643 B2 8/2017 Lin
9,738,225 B1 8/2017 Au
9,752,754 B2 9/2017 Trincia
9,769,179 B2 9/2017 Pal
9,769,616 B1 9/2017 Pao
9,773,071 B2 9/2017 Lee
D803,812 S 11/2017 Liu
9,823,081 B2 11/2017 Crawford
9,827,897 B1 11/2017 Muir
D806,293 S 12/2017 Pennington
9,836,763 B2 12/2017 Landers
9,911,169 B1 3/2018 Geist
9,934,691 B2 4/2018 Millspaugh
10,012,515 B2 7/2018 Wesselius
10,055,694 B2 8/2018 Ichinose
10,081,298 B2 9/2018 Stanfield
10,083,448 B2 9/2018 Cheng
10,121,162 B2 11/2018 Fletcher
10,177,859 B2 1/2019 Barth
10,181,910 B2 1/2019 Mallik
10,185,967 B2 1/2019 Anand
10,197,410 B2 2/2019 Guo
10,198,700 B2 2/2019 Farrelly
10,217,135 B2 2/2019 Brown
10,262,535 B2 4/2019 König
10,310,505 B1 6/2019 Hanson
10,354,108 B2 7/2019 Mcquade
RE47,567 E 8/2019 Kato
10,417,333 B2 9/2019 Lee
10,417,673 B2 9/2019 Amin
10,427,604 B2 10/2019 Schofield
10,444,028 B2 10/2019 Nortrup
10,467,554 B2 11/2019 Yoo
10,520,325 B2 12/2019 Lewinson
D875,115 S 2/2020 Yan
D875,133 S 2/2020 Wang
10,554,783 B2 2/2020 Matthiesen
10,572,852 B2 2/2020 Santo
D879,804 S 3/2020 Corona
D880,499 S 4/2020 Fatnani
10,628,758 B2 4/2020 Ikeda
10,636,108 B2 4/2020 Eyler
10,688,919 B2 6/2020 Kalanick
10,743,134 B2 8/2020 Lin
D896,237 S 9/2020 Bentley
10,766,417 B2 9/2020 Lu
10,772,765 B2 9/2020 Boncyk
10,783,791 B2 9/2020 Felt
10,843,708 B1 11/2020 Szybalski
RE48,359 E 12/2020 Harris
10,867,330 B2 12/2020 Bijor
10,873,839 B2 12/2020 Tao
10,875,455 B2 12/2020 Baur
10,875,536 B2 12/2020 Fung
10,877,480 B1 12/2020 Arden
10,896,552 B2 1/2021 Gravelle
10,899,315 B2 1/2021 Reh
10,915,761 B2 2/2021 Sabeti
10,928,209 B2 2/2021 Scofield
10,935,382 B2 3/2021 Holden
10,990,110 B2 4/2021 Chiappetta
11,004,343 B2 5/2021 Lambert
11,010,693 B2 5/2021 Sarawgi
11,068,811 B2 7/2021 Camp
11,070,944 B2 7/2021 Lubeck
11,100,434 B2 8/2021 Lord
11,104,245 B2 8/2021 Penilla
11,386,781 B1 * 7/2022 Demisse ................ G08G 1/017
2001/0056363 A1 12/2001 Gantz
2002/0011940 A1 1/2002 Cappel
2002/0034292 A1 3/2002 Tuoriniemi
2002/0052751 A1 5/2002 Ebata
2002/0058517 A1 5/2002 Furukawa
2002/0097193 A1 7/2002 Powers
2002/0099500 A1 7/2002 Schmier
2002/0127997 A1 9/2002 Karlstedt
2002/0135515 A1 9/2002 Rankin
2002/0173978 A1 11/2002 Boies
2003/0040850 A1 2/2003 Najmi
2003/0065556 A1 4/2003 Takanashi
2003/0139941 A1 7/2003 Matsumoto
2003/0217150 A1 11/2003 Roese
2004/0015475 A1 1/2004 Scheepsma
2004/0049424 A1 3/2004 Murray
2004/0076280 A1 4/2004 Ando
2004/0107110 A1 6/2004 Gottlieb
2004/0158483 A1 8/2004 Lecouturier
2004/0177109 A1 9/2004 Lee
2004/0260470 A1 12/2004 Rast
2004/0266460 A1 12/2004 Reynolds
2005/0012598 A1 1/2005 Berquist
2005/0114014 A1 5/2005 Isaac
2005/0153707 A1 7/2005 Ledyard
2005/0227704 A1 10/2005 Ferra
2006/0034201 A1 2/2006 Umeda
2006/0039577 A1 2/2006 Sanguino
2006/0059023 A1 3/2006 Mashinsky
2006/0059745 A1 3/2006 Maqui
2006/0178949 A1 8/2006 McGrath
2006/0234631 A1 10/2006 Dieguez
2006/0259353 A1 11/2006 Gutmann
2007/0073552 A1 3/2007 Hileman
2007/0136095 A1 6/2007 Weinstein
2007/0150369 A1 6/2007 Zivin
2007/0150375 A1 6/2007 Yang
2007/0266114 A1 11/2007 Heo
2008/0084360 A1 4/2008 Shingai
2008/0091342 A1 4/2008 Assael
2008/0114629 A1 5/2008 Pavlov
2008/0140479 A1 6/2008 Mello
2008/0167892 A1 7/2008 Clark
2008/0195428 A1 8/2008 O'Sullivan
2008/0236007 A1 10/2008 Au
2008/0270019 A1 10/2008 Anderson
2008/0270204 A1 10/2008 Poykko
2008/0275645 A1 11/2008 Hoshino
2008/0284578 A1 11/2008 Mouratidis

(56) References Cited

U.S. PATENT DOCUMENTS

| | | | |
|---|---|---|---|
| 2008/0298058 | A1 | 12/2008 | Kan |
| 2009/0089105 | A1 | 4/2009 | Wu |
| 2009/0171799 | A1 | 7/2009 | Ying |
| 2009/0177502 | A1 | 7/2009 | Doinoff |
| 2009/0192851 | A1 | 7/2009 | Bishop |
| 2009/0216600 | A1 | 8/2009 | Hill |
| 2009/0234573 | A1 | 9/2009 | Notarantonio |
| 2009/0281844 | A1 | 11/2009 | Probst |
| 2009/0313077 | A1 | 12/2009 | Wheeler, IV |
| 2009/0319181 | A1 | 12/2009 | Khosravy |
| 2010/0063934 | A1 | 3/2010 | Khoo |
| 2010/0198428 | A1 | 8/2010 | Sultan |
| 2010/0205017 | A1 | 8/2010 | Sichelman |
| 2010/0217613 | A1 | 8/2010 | Kelly |
| 2010/0260350 | A1 | 10/2010 | Chutorash |
| 2010/0317377 | A1 | 12/2010 | Zou |
| 2011/0026716 | A1 | 2/2011 | Tang |
| 2011/0102165 | A1 | 5/2011 | Rahamim |
| 2011/0156894 | A1 | 6/2011 | Lin |
| 2011/0225269 | A1 | 9/2011 | Yap |
| 2011/0301997 | A1 | 12/2011 | Gale |
| 2011/0313880 | A1 | 12/2011 | Paul |
| 2012/0041675 | A1 | 2/2012 | Juliver |
| 2012/0059693 | A1 | 3/2012 | Colodny |
| 2012/0078672 | A1 | 3/2012 | Mohebbi |
| 2012/0081389 | A1 | 4/2012 | Dilts |
| 2012/0109694 | A1 | 5/2012 | Lee |
| 2012/0127196 | A1 | 5/2012 | Landry |
| 2012/0130627 | A1 | 5/2012 | Islam |
| 2012/0131170 | A1 | 5/2012 | Spat |
| 2012/0137256 | A1 | 5/2012 | Lalancette |
| 2012/0203599 | A1 | 8/2012 | Choi |
| 2013/0018795 | A1 | 1/2013 | Kolhatkar |
| 2013/0073327 | A1 | 3/2013 | Edelberg |
| 2013/0090963 | A1 | 4/2013 | Sharma |
| 2013/0102333 | A1 | 4/2013 | Dam |
| 2013/0124279 | A1 | 5/2013 | Bodin |
| 2013/0132140 | A1 | 5/2013 | Amin |
| 2013/0144660 | A1 | 6/2013 | Martin |
| 2013/0179205 | A1 | 7/2013 | Slinin |
| 2013/0179215 | A1 | 7/2013 | Foster |
| 2013/0185109 | A1 | 7/2013 | Loabneh |
| 2013/0211916 | A1 | 8/2013 | Putman |
| 2013/0218647 | A1 | 8/2013 | Kroll |
| 2013/0289858 | A1 | 10/2013 | Mangiat |
| 2014/0011522 | A1 | 1/2014 | Lin |
| 2014/0032282 | A1 | 1/2014 | Fu |
| 2014/0081764 | A1 | 3/2014 | James |
| 2014/0082069 | A1 | 3/2014 | Varoglu |
| 2014/0129951 | A1 | 5/2014 | Amin |
| 2014/0141840 | A1 | 5/2014 | Pereira |
| 2014/0156556 | A1 | 6/2014 | Lavian |
| 2014/0172727 | A1 | 6/2014 | Abhyanker |
| 2014/0200739 | A1 | 7/2014 | Kirsch |
| 2014/0222832 | A1 | 8/2014 | Weill |
| 2014/0300449 | A1 | 10/2014 | Kounavis |
| 2014/0365250 | A1 | 12/2014 | Ikeda |
| 2015/0032328 | A1 | 1/2015 | Healey |
| 2015/0081362 | A1 | 3/2015 | Chadwick |
| 2015/0127439 | A1 | 5/2015 | Campos |
| 2015/0142484 | A1 | 5/2015 | Huang |
| 2015/0148989 | A1 | 5/2015 | Cooper |
| 2015/0154810 | A1 | 6/2015 | Tew |
| 2015/0161752 | A1 | 6/2015 | Barreto |
| 2015/0302342 | A1 | 10/2015 | Yeh |
| 2015/0317568 | A1 | 11/2015 | Grasso |
| 2015/0332425 | A1 | 11/2015 | Kalanick |
| 2015/0339923 | A1 | 11/2015 | König |
| 2016/0019728 | A1 | 1/2016 | Petrie |
| 2016/0021154 | A1 | 1/2016 | Schoeffler |
| 2016/0034828 | A1 | 2/2016 | Sarawgi |
| 2016/0117610 | A1 | 4/2016 | Ikeda |
| 2016/0140404 | A1 | 5/2016 | Rosen |
| 2016/0293012 | A1 | 10/2016 | Lubeck |
| 2017/0052034 | A1 | 2/2017 | Magazinik |
| 2017/0178269 | A1 | 6/2017 | Mckinnon |
| 2017/0300848 | A1 | 10/2017 | Shoval |
| 2018/0060827 | A1 | 3/2018 | Abbas |
| 2018/0096445 | A1 | 4/2018 | Eyler |
| 2018/0102017 | A1* | 4/2018 | Brinig .................. G06K 7/1095 |
| 2019/0009721 | A1 | 1/2019 | Schofield et al. |
| 2019/0050880 | A1 | 2/2019 | Paul |
| 2019/0095849 | A1 | 3/2019 | Sweeney |
| 2019/0266518 | A1 | 8/2019 | Medina |
| 2020/0211142 | A1 | 7/2020 | James |

FOREIGN PATENT DOCUMENTS

| | | | |
|---|---|---|---|
| CN | 103778781 | A | 5/2014 |
| CN | 104992509 | A | 10/2015 |
| EP | 0131211 | A1 | 1/1985 |
| EP | 0796482 | A1 | 9/1997 |
| EP | 2918068 | A1 | 9/2015 |
| GB | 2397683 | A | 7/2004 |
| GB | 2473831 | A | 3/2011 |
| JP | S58121457 | A | 7/1983 |
| JP | 2916795 | B2 | 7/1999 |
| JP | 2000082199 | A | 3/2000 |
| JP | 2002074119 | A | 3/2002 |
| JP | 2003036498 | A | 2/2003 |
| JP | 2004078639 | A | 3/2004 |
| JP | 5785377 | B2 | 9/2015 |
| JP | 5935999 | B2 | 6/2016 |
| KR | 20100129531 | A | 12/2010 |
| KR | 101039091 | B1 | 6/2011 |
| KR | 20120090480 | A | 8/2012 |
| KR | 101462034 | B1 | 11/2014 |
| KR | 20150045962 | A | 4/2015 |
| WO | 1999/044186 | A1 | 9/1999 |
| WO | 2002/073546 | A2 | 9/2002 |
| WO | 2005/013588 | A1 | 2/2005 |
| WO | 2011/067741 | A1 | 6/2011 |

OTHER PUBLICATIONS

USPTO, IPR2021-01602, U.S. Pat. No. 10,748,417, Final Written Decision dated Apr. 10, 2023.
USPTO, IPR2021-01600, U.S. Pat. No. 10,395,525, Final Written Decision dated Apr. 10, 2023.
USPTO, IPR2021-01599, U.S. Pat. No. 10,169,987, Final Written Decision dated Apr. 10, 2023.
USPTO, IPR2021-01598, U.S. Pat. No. 9,892,637, Final Written Decision dated Apr. 10, 2023.
USPTO, IPR2021-01601, U.S. Pat. No. 10,559,199, Filed Oct. 1, 2021.
USPTO, IPR2021-01602, U.S. Pat. No. 10,748,417, Filed Oct. 1, 2021.
USPTO, IPR2021-01600, U.S. Pat. No. 10,395,525, Filed Oct. 1, 2021.
USPTO, IPR2021-01599, U.S. Pat. No. 10,169,987, Filed Oct. 1, 2021.
USPTO, IPR2021-01598, U.S. Pat. No. 9,892,637, Filed Oct. 1, 2021.
U.S. District Court of Delaware, Defendant Lyft, Inc.'s Initial Invalidity Contentions, Case No. 20-cv-01629-RGA-JLH, Filed Sep. 9, 2021.
USPTO, IPR2021-01601, U.S. Pat. No. 10,559,199, Decision to Institute, Issued Apr. 11, 2022.
USPTO, IPR2021-01602, U.S. Pat. No. 10,748,417, Decision to Institute, Issued Apr. 11, 2022.
USPTO, IPR2021-01600, U.S. Pat. No. 10,395,525, Decision to Institute, Issued Apr. 11, 2022.
USPTO, IPR2021-01599, U.S. Pat. No. 10,169,987, Decision to Institute, Issued Apr. 11, 2022.
USPTO, IPR2021-01598, U.S. Pat. No. 9,892,637, Decision to Institute, Issued Apr. 11, 2022.

* cited by examiner

VEHICLE IDENTIFICATION SYSTEM

CROSS-REFERENCE TO RELATED APPLICATIONS

The present application claims priority to, and the benefit of, U.S. Provisional Application Ser. No. 62/004,753 entitled "VEHICLE IDENTIFYING SYSTEM," filed on May 29, 2014, the disclosure of which is herein incorporated by reference in its entirety.

STATEMENT RE: FEDERALLY SPONSORED RESEARCH/DEVELOPMENT

Not Applicable

BACKGROUND

Technical Field

The present disclosure relates generally to a system and method for vehicle identification. More particularly, the present invention relates to a system adapted to provide an indicator on a mobile communication device of a user having requested a ride service to allow the user to identify a vehicle prior to boarding the vehicle.

Related Art

The rapid technological advances in the Internet, mobile communications technologies, and social networking have opened up opportunities for tech-enabled transportation services that provide on-demand individual transportation. In one ride-hailing model, drivers and riders use mobile phones connected to a web service to arrange rides. Before riding with UBER, for example, customers are required to create an account with their personal and payment information, and rides can only be requested through the application.

To varying degrees, on-demand transportation service providers employ ideas from social networking, reputation systems, and Global Positioning System (GPS) tracking to provide service. Although these companies may appear to be taxi companies to riders, they are actually dispatching services which serve both riders and drivers.

Technology-enabled transportation services, such as UBER and LYFT, may help to improve the public's transportation options. Expanding the availability of on-demand transportation modes and technology-enabled tools may give more people the freedom to live "car-free" or "car-light" lifestyles—avoiding the cost of owning, insuring, maintaining and garaging a private vehicle.

There are numerous barriers that have prevented people from using non-driving modes of transportation. Public transportation use, for example, is often limited by perceptions of personal security in public transportation travel. Rider safety is fundamental to the continued success of transportation services, but driver safety has also become an issue.

A continuing need exists for systems and methods adapted for use by transportation services to ensure rider and driver security.

BRIEF SUMMARY

According to an aspect of the present disclosure, a vehicle identification system is provided. The vehicle identification system includes one or more displays associated with a vehicle, a transceiver, and a controller communicatively coupled to the transceiver. The one or more displays are located to be visible from an exterior of the vehicle. The controller is adapted to generate a first signal to be transmitted by the transceiver to a mobile communication device associated with a driver of the vehicle when it is determined that the vehicle is within a predetermined distance of a specific location. The mobile communication device associated with the driver is adapted to generate a second signal to be transmitted to the one or more displays. The second signal represents an indicator.

According to another aspect of the present disclosure, a method of identifying a vehicle dispatched to a location of a user having requested a ride from a transportation service is provided. The method includes: when it is determined that the vehicle is within a predetermined distance of the location of the user, generating a notification signal to a mobile communication device associated with the driver; generating an indicatory signal representing an indicator in response to receiving the notification signal; and displaying, on a display associated with the vehicle, the indicator based on the notification signal. The display is located to be visible on the exterior of the vehicle. The method also includes: displaying the indicator on a mobile communication device associated with the user; and identifying the vehicle based on appearance of a match, by visual observation of the user, between the indicator being displayed on the mobile communication device associated with the user and the indicator being displayed on the display associated with the vehicle.

BRIEF DESCRIPTION OF THE DRAWINGS

Objects and features of the presently-disclosed systems and methods for vehicle identification will become apparent to those of ordinary skill in the art when descriptions of various embodiments thereof are read with reference to the accompanying drawings, of which.

DETAILED DESCRIPTION

Figure 1A:
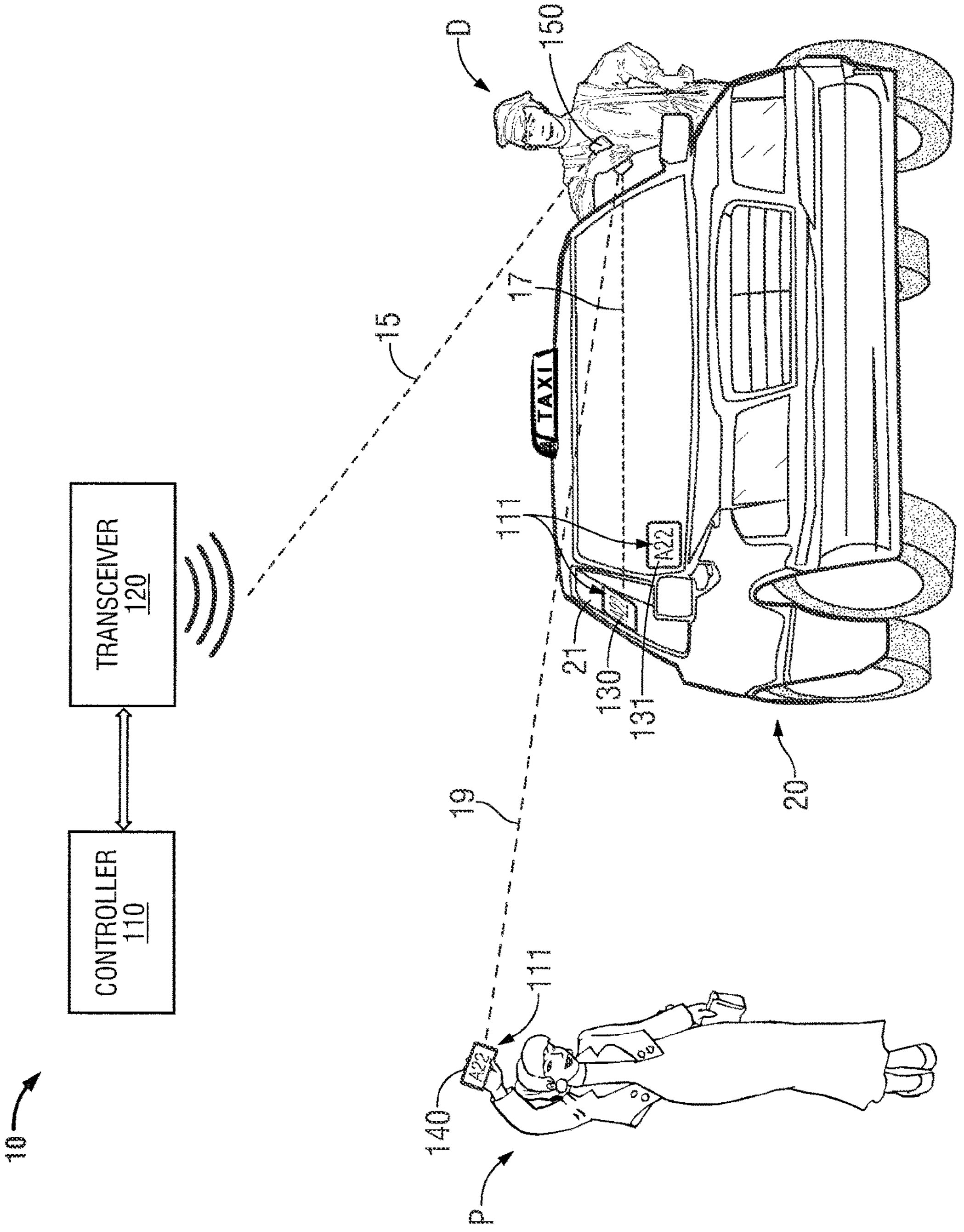
FIG. 1A is a diagrammatic illustration of a system for vehicle identification in accordance with an embodiment of the present disclosure.

Hereinafter, embodiments of a system and method for vehicle identification are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

As used herein, the term "controller" may include any type of computing device, computational circuit, or any type of processor or processing circuit capable of executing a series of instructions that are stored in a memory associated with the controller. As it is used herein, "mobile communication device" generally refers to any portable wireless device. In one instance, the mobile communication device has one or more processors and memory capability. Examples of mobile communication devices include, without limitation, cellular (cell) and mobile telephones, smart mobile telephones, mobile e-mail devices, digital personal assistants, etc.

Various embodiments of the present disclosure provide a vehicle identification system adapted to provide an indicator on a mobile communication device of a user having requested a ride service to allow the user to identify a vehicle prior to boarding the vehicle. Various embodiments of the presently-disclosed vehicle identification systems are adapted to provide a notification signal for activating a driver's mobile communication device to generate a signal representing an indicator, whereby the indicator is displayed on a display visible from the exterior of the vehicle. The indicator may additionally, or alternatively, be displayed on a display associated with an article of clothing (e.g., coat or hat) worn by the driver and/or displayed on a remote hand-held display device (e.g., tablet computer) held by the driver. The presently-disclosed vehicle identification systems and methods for vehicle identification may be used in coordination with services that use mobile fleets of vehicles or personnel in a variety of scenarios. Vehicle identification systems and methods described herein may be used in combination with chauffeured driving services, such as taxi cab providers, car sharing and car services (e.g., UBER, LYFT, FLYWHEEL), limo services, shuttles (e.g., airport-operated shuttle buses, door-to-door shuttles), police dispatch, package delivery services (e.g., UPS, FEDEX, couriers, drones), and/or mobile military units. Vehicle identification systems and methods described herein may be implemented, in whole or in part, as an application running as a standalone program or may be embedded into third-party applications, e.g., UBER, LYFT, etc. Embodiments of the presently-disclosed vehicle identification system can be implemented as software, hardware, firmware or any combination thereof. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries. Those skilled in the art will readily appreciate that where the presently-disclosed vehicle identification system is implemented in whole or in part in software, the software components thereof may be stored on computer readable media as computer program products. Any form of computer readable medium may be used in this context, such as magnetic or optical storage media. Additionally, software portions of the present invention may be instantiated (for example as object code or executable images) within the memory of any programmable computing device.

FIG. 1A shows a vehicle identification system 10 in accordance with an embodiment of the present disclosure. The vehicle identification system 10 includes a controller 110, a transceiver 120, and one or more displays associated with a motor vehicle 20. In the illustrative embodiment shown in FIG. 1A, a first display 130 is associated with a passenger side rear window 21 of a motor vehicle 20, and a second display 131 is associated with the front windshield of the motor vehicle 20. In some embodiments, the controller 110 may be a computer network controller or a server. In some embodiments, the controller 110 is communicatively coupled to the transceiver 120. The transceiver 120 may consist of one or more cell phone towers of a tower network. It is to be understood that the transceiver 120 may be any device capable of wireless communication with a mobile communication device 150 associated with the driver D and/or a mobile communication device 140 associated with the user P. For example, the transceiver 120 may consist of satellites instead of land-based cell towers.

The vehicle identification system 10 may be adapted to generate one or more signals representing an indicator, which may be displayable as a "code" (e.g., a text string or an alphanumeric string), an icon, or other identifier, on the display 130 and on a mobile communication device 140 associated with the user P to enable the user P to identify the vehicle that he/she has requested for a ride service. Although one display 130 is shown associated with a passenger side rear window 21 of the motor vehicle 20, it is to be understood that one or more displays 130 may be mounted on or otherwise associated with the front windshield, rear shield, passenger side front window, passenger side rear window, driver side rear window, and/or driver side front window of the ride-service vehicle. Those skilled in the art will readily appreciate that the display may be disposed on other areas of the vehicle, e.g., door and body panels. Display 130 may be operatively connected to a receiver. As described in more detail below, the vehicle identification system 10 may be adapted to generate a first signal that is transmitted via the transceiver 120 to a mobile communication device 150 associated with the driver, wherein, in response to receiving the first signal, an application on the mobile communication device 150 associated with the driver D generates a second signal 17 representing an indicator 111 that is transmitted to the display 130.

Figure 1B:
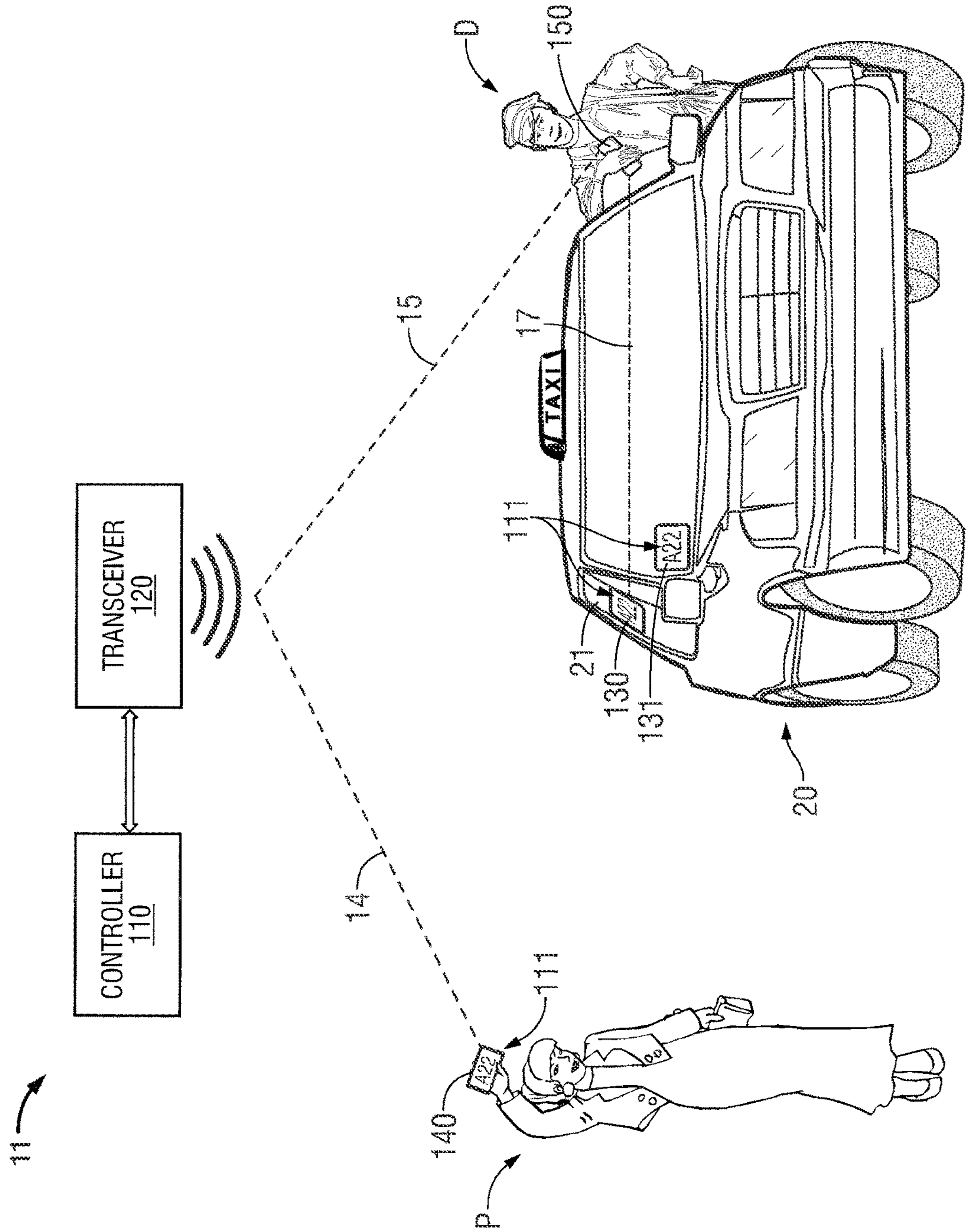
FIG. 1B is a diagrammatic illustration of a system for vehicle identification in accordance with another embodiment of the present disclosure.

It is to be understood that the dashed lines indicative of wireless links between various components of the vehicle identification system 10 shown in FIG. 1A and the vehicle identification system 11 shown in FIG. 1B are merely illustrative and non-limiting examples of wireless connections, and that vehicle identification system embodiments of the present disclosure may utilize many different configurations of wireless connections, some with additional, fewer, or different links than depicted in FIGS. 1A and 1B. For example, in some embodiments, the display 130 may be adapted to establish a wireless connection with a mobile communication device 140 associated with the user P.

A signal from a mobile communication device 140 of a user P may be provided to a taxi cab service, in order to have a taxi driver D dispatched to the location of the user P. A signal from a user's mobile communication device 140 may be provided to a car service, e.g., the UBER service, in order to have a driver from the service dispatched to the location of the user P. Those skilled in the art will readily appreciate that various different transportation services, e.g., UBER, LYFT, limos and any other kind of ride service, may be requested by the user P. Once a ride service has been requested by the user P, a request may be sent to the user P to download an application to the user's mobile communication device 140. The application may be adapted to receive an indicatory signal and display an indicator, as described in more detail below, and may provide other functionality, e.g., a panic button for sending to law enforcement and/or emergency services providers information related to the mobile communication device 140 including its location, information about the user P associated with the mobile communication device 140, and/or information recorded by the mobile communication device 140 during and subsequent to the time the panic button is activated. It is to be understood that although various components are illustrated and described above as separate entities, each illustrated component represents a collection of functionalities which can be implemented as software, hardware, firmware or any combination of these.

The controller 110 may generate a first signal (also referred to herein as a "notification signal") that is transmitted via the transceiver 120 to the mobile communication device 150 associated with the driver D. In some embodiments, the vehicle identification system 10 is adapted to generate a notification signal once the vehicle 20 approaches the pickup location, e.g., within a predetermined distance based on GPS location. Preferably, the predetermined distance is a suitable distance to provide the user P an opportunity to view the display 130 as the vehicle 20 approaches the pickup location. In an embodiment, the predetermined distance is approximately one quarter mile from the pickup location. In other embodiments, the vehicle identification system 10 may be adapted to generate a notification signal once the vehicle 20 arrives at the pickup location.

In some embodiments, in response to receiving the notification signal, an application on the mobile communication device 150 associated with the driver D generates a second signal 17 (also referred to herein as an "indicatory signal") representing an indicator. The indicatory signal 17 transmitted by the mobile communication device 150 may be received by the display 130 and/or a receiver operatively associated therewith. Responsive to receiving the indicatory signal 17, the display 130 displays the indicator 111. The indicatory signal 17 representative of indicator 111 transmitted by the driver's mobile communication device 150 may additionally, or alternatively, be received by the mobile communication device 140 associated with the user P. In some embodiments, as shown for example in FIG. 1A, a second indicatory signal 19 representative of the indicator 111 is transmitted by the driver's mobile communication device 150 to the mobile communication device 140 associated with the user P. Responsive to receiving the indicatory signal 19, the mobile communication device 140 displays the indicator 111.

FIG. 1B shows a vehicle identification system 11 in accordance with an embodiment of the present disclosure. The vehicle identification system 11 is similar to the vehicle identification system 10 shown in FIG. 1A, except for the configuration of the wireless links. As seen in FIG. 1B, vehicle identification system 11 is adapted to generate an indicatory signal 14 to be transmitted to the mobile communication device 140 associated with the user P and a notification signal 15 to be transmitted to the mobile communication device 150 associated with the driver D. In this embodiment, the driver's mobile communication device 150 does not communicate with the user's mobile communication device 140, being an accommodation for users who prefer to communicate directly with the dispatching service, rather than the driver D.

In an illustrative example wherein a dispatched vehicle 20 arrives at the pickup location and waits for the user P who requested the ride service, the vehicle 20 may be parked by itself or parked among other similar and/or not similar vehicles. When the user P who requested the ride service approaches the pickup area, in order to locate his/her ride the user P need only visually observe a vehicle 20 with the display 130 displaying the indicator 111 that is a match to the indicator 111 (e.g., A22 shown in FIGS. 1A and 1B) being displayed on the user's mobile communication device 140. Once the user P has identified the vehicle 20, the user P may be requested to show the indicator 111 displayed on his/her mobile communication device 140 to the driver D, e.g., to allow the driver D to verify that he/she is picking up the person who actually requested the ride service.

In some embodiments, the indicator 111 may be a "code" such as an alphanumeric string, e.g., A22, B11, C44, and so on. Preferably, the code would not be duplicated in the same pickup location. In some embodiments, when the driver D turns on the fare meter, the code (or other indicator) is deleted. If there is a need for the driver D to pick up another person, when the driver D approaches the second location (or third location, etc.), the vehicle identification system 10 may generate another notification signal. Alternatively, the vehicle identification system 10 may be adapted to allow the driver to enter a command on the driver's mobile communication device 150 so that another code (or other indicator) can be generated for the next rider who is going to share the same vehicle. In some embodiments, the vehicle identification system 10 may be adapted to allow the user P who originally requested the ride service that was picked up at the first location to text the code, or otherwise send the indicator, to another person who is going to share the ride.

It is to be understood that multiple drivers and vehicles may be dispatched to the same or different locations, e.g., concurrently or sequentially, and the vehicle identification system 10 (and/or the vehicle identification system 11) may generate any number of notification signals. In an illustrative embodiment of the vehicle identification system 10 shown in FIG. 3, four ride service requests VEHICLE REQUEST-A, VEHICLE REQUEST-B, VEHICLE REQUEST-C, and VEHICLE REQUEST-D are received from four users (also referred to herein as "riders") for pickup. The controller 110 generates four different notification signals, NOTIFICATION-A, NOTIFICATION-B, NOTIFICATION-C, and NOTIFICATION-D, to be transmitted by the transceiver 120 to a first DRIVER'S MOBILE DEVICE 150A, a second DRIVER'S MOBILE DEVICE 150B, a third DRIVER'S MOBILE DEVICE 150C, and a fourth DRIVER'S MOBILE DEVICE 150D, respectively.

Figure 2:
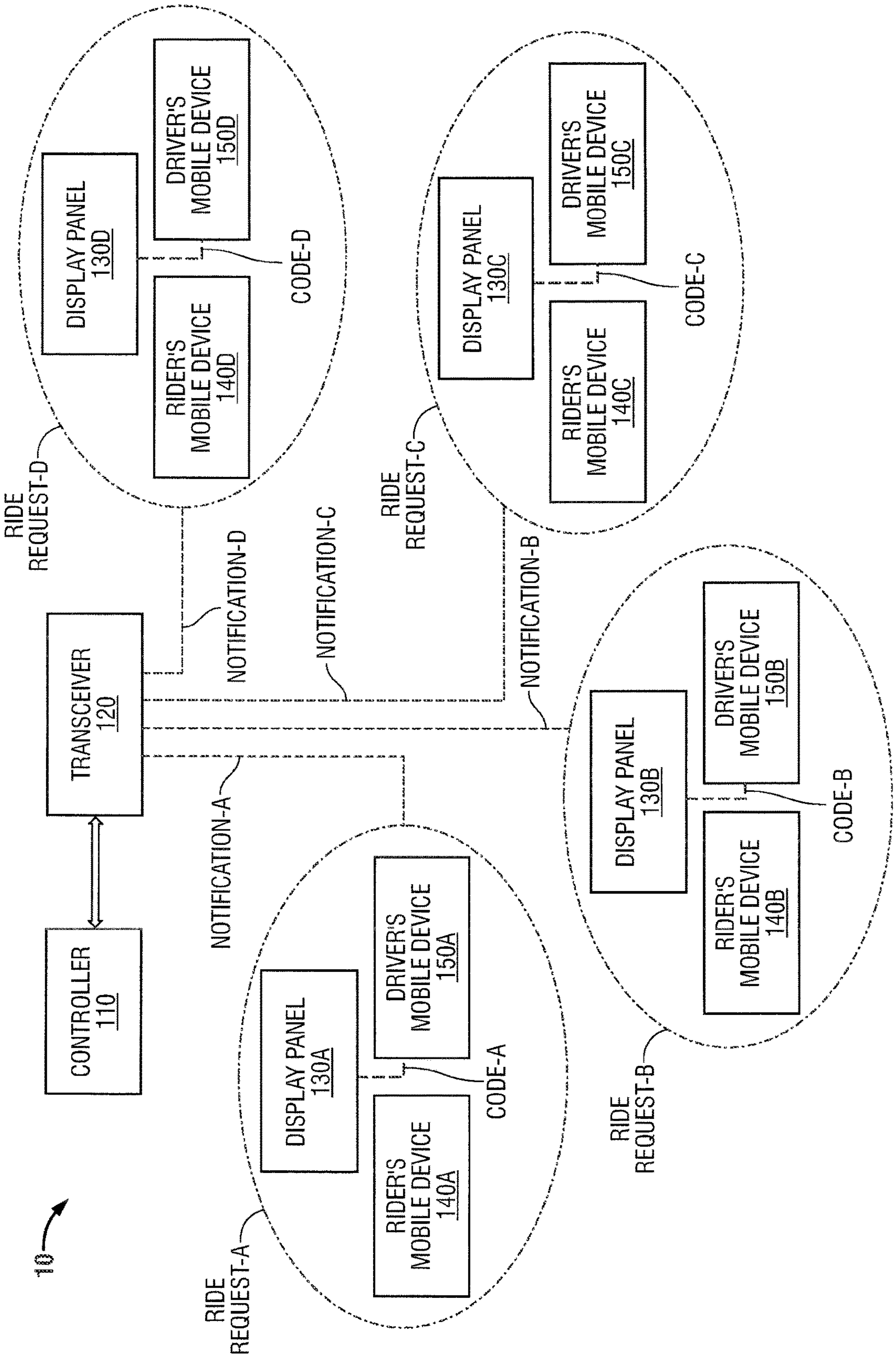
FIG. 2 is schematic illustration of the system for vehicle identification of FIG. 1A servicing multiple riders in accordance with an embodiment of the present disclosure.

As seen in FIG. 2, in response to receiving the NOTIFICATION-A the first DRIVER'S MOBILE DEVICE 150A transmits an indicatory signal CODE-A to the DISPLAY PANEL 130A, in response to receiving the NOTIFICATION-B the second DRIVER'S MOBILE DEVICE 150B transmits an indicatory signal CODE-B to the DISPLAY PANEL 130B, in response to receiving the NOTIFICATION-C the third DRIVER'S MOBILE DEVICE 150C transmits an indicatory signal CODE-C to the DISPLAY PANEL 130C, and in response to receiving the NOTIFICATION-D the fourth DRIVER'S MOBILE DEVICE 150D transmits an indicatory signal CODE-D to the DISPLAY PANEL 130D.

In some embodiments, wherein the vehicle identification system 10 is utilized, the first RIDER'S MOBILE DEVICE 140A may receive the indicatory signal CODE-A from the first DRIVER'S MOBILE DEVICE 150A, the second RIDER'S MOBILE DEVICE 140B may receive the indicatory signal CODE-B from the second DRIVER'S MOBILE DEVICE 150B, the third RIDER'S MOBILE DEVICE 140C may receive the indicatory signal CODE-C from the third DRIVER'S MOBILE DEVICE 150C, and the fourth RIDER'S MOBILE DEVICE 140D may receive the indicatory signal CODE-D from the fourth DRIVER'S MOBILE DEVICE 150D. In other embodiments, wherein the vehicle identification system 11 is utilized, an indicatory signal to the rider's mobile communication device may be generated by the controller 110.

Figure 3:
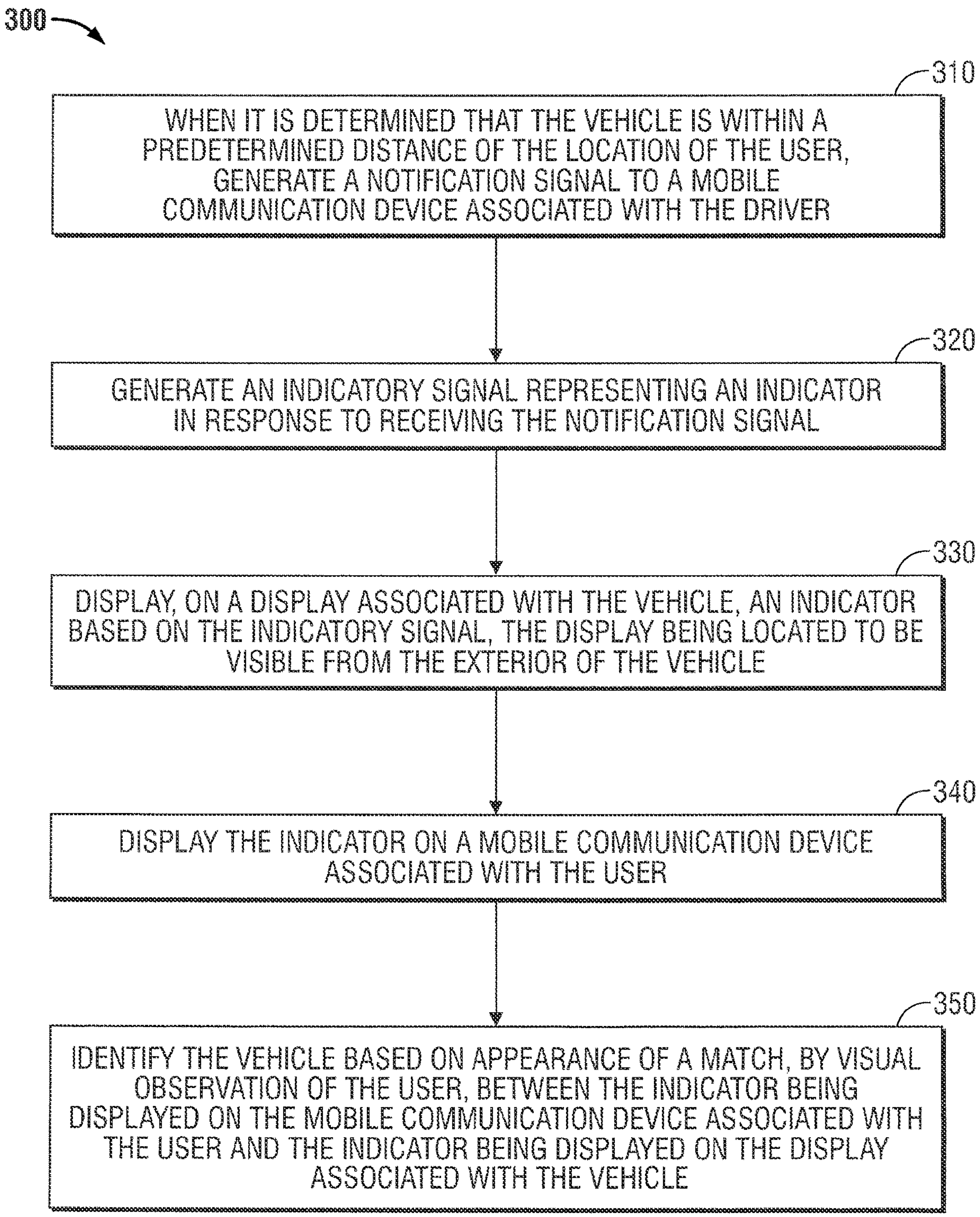
FIG. 3 is a flowchart illustrating a method of identifying a vehicle in accordance with an embodiment of the present disclosure.

FIG. 3 shows a flowchart illustrating a method of identifying a vehicle being dispatched to a location of a user having requested a ride from a transportation service in accordance with an embodiment of the present disclosure. At block 310, when it is determined that the vehicle 20 is within a predetermined distance of the location of the user P, a notification signal 15 is generated to a mobile communication device 150 associated with the driver D.

At block 320, an indicatory signal 17 representing an indicator 111 is generated in response to receiving the notification signal 15.

At block 330, an indicator 111 based on the indicatory signal 17 is displayed on a display 130 associated with the vehicle 20. The display 130, 131 is located to be visible on the exterior of the vehicle 20.

At block 340, the indicator 111 is displayed on a mobile communication device 140 associated with the user P.

At block 350, the vehicle 20 is identified based on appearance of a match, by visual observation of the user P, between the indicator 111 being displayed on the mobile communication device 140 associated with the user P and the indicator 111 being displayed on the display 130, 131 associated with the vehicle 20.

Although embodiments have been described in detail with reference to the accompanying drawings for the purpose of illustration and description, it is to be understood that the disclosed systems and processes are not to be construed as limited thereby. It will be apparent to those of ordinary skill in the art that various modifications to the foregoing embodiments may be made without departing from the scope of the disclosure.

What is claimed is:

1. A method of identifying a vehicle, comprising:

receiving a request from a rider for a transportation service, the request submitted via a hand-held mobile communication device associated with the rider;

identifying a pick-up location of the rider;

identifying the time of the request for a transportation service;

identifying indicators being used at the pick-up location;

generating a notification signal for transmission to a hand-held mobile communication device associated with the driver;

generating an indicator and an indicatory signal representing the indicator, wherein the indicator generated is not duplicated within the pick-up location of the rider at the time of the request;

displaying, on a display associated with the vehicle, the indicator based on the notification and indicatory signals, the display located to be visible from the exterior of the vehicle;

transmitting the indicator and indicatory signal to the hand-held mobile communication device associate with the rider; and displaying the indicator on the hand-held mobile communication device associated with the rider.

2. The method of claim 1, further comprising deleting the indicator after the requested vehicle transport service commences.

3. The method of claim 1, wherein the notification signal, indicator and indicatory signal generated are specific to a single request from a rider for a transportation service.

4. The method of claim 1, wherein the request from a user for a transportation service includes a pick-up location of the rider at the time of receipt of the request.

5. The method of claim 1, wherein the indicator and indicatory signal are generated by a controller.

6. The method of claim 1, wherein the indicatory signal is generated by the hand-held mobile communication device associated with the driver.

7. The method of claim 1, wherein the identifying indicators being used at the pick-up location occurs in advance of generating a notification signal.

8. The method of claim 1, further comprising displaying the indicator on a mobile communication device associated with the driver.

9. The method of claim 1, wherein the indicator is received by a first rider and sent to a second rider, with the first and second riders transported in the same vehicle.

10. A vehicle identification system comprising:

a display associated with a vehicle, the display located to be visible from the exterior of the vehicle;

a transceiver;

a controller, the controller communicatively coupled to the transceiver and adapted to:

receive a request from a rider for a transportation service, the request submitted via a hand-held mobile communication device associated with the rider;

identify a pick-up location of the rider;

identify the time of the request for a transportation service;

identify indicator(s) being used at the pick-up location;

generate a notification signal for transmission to a hand-held mobile communication device associated with the driver;

generate an indicator and an indicatory signal representing the indicator, wherein the indicator generated is not duplicated within the pick-up location of the rider at the time of the request;

transmit the indicator and indicatory signal to the hand-held mobile communication device associate with the rider;

transmit the indicator and indicatory signal to the display associated with the vehicle, wherein the display associated with the vehicle is configured to display the indicator; and delete the indicator after the requested vehicle transport service commences.

* * * * *